United States Patent [19]
Zebuhr

[11] 4,042,018
[45] Aug. 16, 1977

[54] PACKAGING FOR HEAT EXCHANGERS

[75] Inventor: William Henry Zebuhr, Nashua, N.H.

[73] Assignee: Des Champs Laboratories Incorporated, East Hanover, N.J.

[21] Appl. No.: 617,733

[22] Filed: Sept. 29, 1975

[51] Int. Cl.² .............................................. F28F 3/12
[52] U.S. Cl. .................................................. 165/166
[58] Field of Search ....................... 165/157, 165, 166

[56] References Cited
U.S. PATENT DOCUMENTS

| | | | |
|---|---|---|---|
| 1,409,520 | 3/1922 | Bird | 165/166 |
| 2,875,986 | 3/1959 | Holm | 165/166 |
| 3,525,390 | 8/1970 | Rothman | 165/166 |
| 3,829,945 | 8/1974 | Kanzler et al. | 165/166 |
| 3,877,519 | 4/1975 | Tramuta et al. | 165/166 |

Primary Examiner—Carroll B. Dority, Jr.
Assistant Examiner—Theophil W. Streule, Jr.
Attorney, Agent, or Firm—Martin G. Raskin

[57] ABSTRACT

Packaging systems for gas to gas counter-flow heat exchangers include locating individual heat exchanger modules adjacent to each other within a housing and providing a plurality of plenum chambers partially defined by suitably arranged baffles. The arrangements disclosed provide heat exchanger assemblies wherein the length of fluid flow path is significantly larger than at least one of the width dimensions of the flow stream thus minimizing entrance effects which tend to reduce the efficiency of the system.

6 Claims, 3 Drawing Figures

PACKAGING FOR HEAT EXCHANGERS

BACKGROUND OF THE INVENTION

Gas to gas counter-flow heat exchangers are well known. In particular, heat exchanger modules comprising a folded sheet of heat conductive material, the individual folds of the sheet defining adjacent fluid flow passages, wherein alternate ones of the passages defined first conduit means for conducting relatively cool gases and wherein the other passages define second conduit means for conducting relatively warm gases, and a casing in which the folded sheet is contained, the casing having entrance and exit openings for each conduit means, are well known (See, for example, U.S. Pat. No. 2,019,351 to Lathrop). These heat exchanger modules have the common characteristic that the length of the flow path in each conduit means is significantly larger than at least one of the width dimensions of the flow path to minimize deleterious entrance effects.

Thus, should it be desired to increase the capacity of such a heat exchanger module, the width of the module must be increased since the maximum dimension of the depth is limited. However, even the width dimension of such a heat exchanger module is limited in that the space in which the module is to be installed is often limited. Even if the installation space does not impose such a requirement, increasing the width of a heat exchanger module often results in the module attaining awkward dimensions.

Thus there is a problem in the design of high capacity gas to gas counter-flow heat exchangers of the type described hereinabove.

SUMMARY OF THE INVENTION

Accordingly, one object of the present dimension is to provide new and improved packaging systems for gas to gas counter-flow heat exchangers.

Another object of the present invention is to provide a new and improved heat exchanger packaging system for modular heat exchangers for maximizing fluid flow capacity within minimum space requirements.

Still another object of the present invention is to provide a packaging system for heat exchangers which minimizes deleterious entrance effects commonly found in modular gas to gas counter-flow heat exchangers without excessively increasing any given dimensions, e.g., width.

Briefly, in accordance with the present invention, these and other objects are attained by providing, in one embodiment, at least one (and preferably more than one) heat exchanger module comprising a core formed of a folded sheet of heat conductive material defining adjacent fluid flow passages, alternate adjacent passages defining first and second conduit means for relatively warm and cool gases respectively, the core being contained within a casing having a pair of opposed sides and first and second end walls with entrance and exit openings for each conduit means being provided in the respective opposed sides. First and second plenum chambers are defined by a housing, a casing end wall and baffle means, the first plenum chamber fluidly communicating with the first conduit means entrance opening while the second plenum chamber fluidly communicates with the second conduit means exit opening. The third and fourth plenum chambers are defined by the housing, the other casing end wall and baffle means, the third plenum chamber fluidly communicating with the first conduit means exit opening and the fourth plenum chamber fluidly communicating with the second conduit means entrance opening. A plurality of such heat exchanger modules may be positioned relative to each other so that the entrance and exit openings of the first conduit means of one heat exchanger module are in confronting, spaced relationship to the entrance and exit openings respectively of the second conduit means of the other heat exchanger module.

In another embodiment heat exchanger modules of the type described hereinabove, are located in side by side relationship, first and second opposed sides of each heat exchanger module casing being laterally juxtaposed with the first and second opposed sides respectively of each other heat exchanger in substantially coplanar relationships so that the entrance and exit openings of the first and second conduit means of each heat exchanger module are laterally juxtaposed relative to the entrance and exit openings of the first and second conduit means respectively of each other heat exchanger. First and second plenum chambers are defined by a housing, a casing opposed side and baffle means, the first plenum chamber fluidly communicating with the first conduit means entrance openings while the second plenum chamber fluidly communicates with the first conduit means exit openings. The third and fourth plenum chambers are defined by a housing, the other casing opposed side and baffle means, the third plenum chamber fluidly communicating with the second conduit means exit openings while the fourth plenum chamber fluidly communicates with the second conduit means entrance opening. Each such assembly of laterally exchanger modules comprises a set of heat exchangers. A plurality of such sets may be provided so that the second opposed sides of, for example, the second heat exchanger set is in confronting spaced relationship to the second opposed sides of the first heat exchanger set. In such case, additional plenum chambers are defined between the confronting, opposed sides of the heat exchanger sets. Further, heat exchanger sets may be provided vertically with respect to each other. The entrance and exit openings of the plenum chambers are generally located in planes substantially perpendicular to the entrance and exit openings of the conduit means of the heat exchanger modules.

The above-described structure results in heat exchanger assemblies having maximum fluid flow capacity but which necessitates a minimum of space requirements and which substantially eliminates deleterious entrance and exit effects commonly associated with heat exchanger modules of the type hereinabove described.

DESCRIPTION OF THE PREFERRED EMBODIMENT

Figure 1:
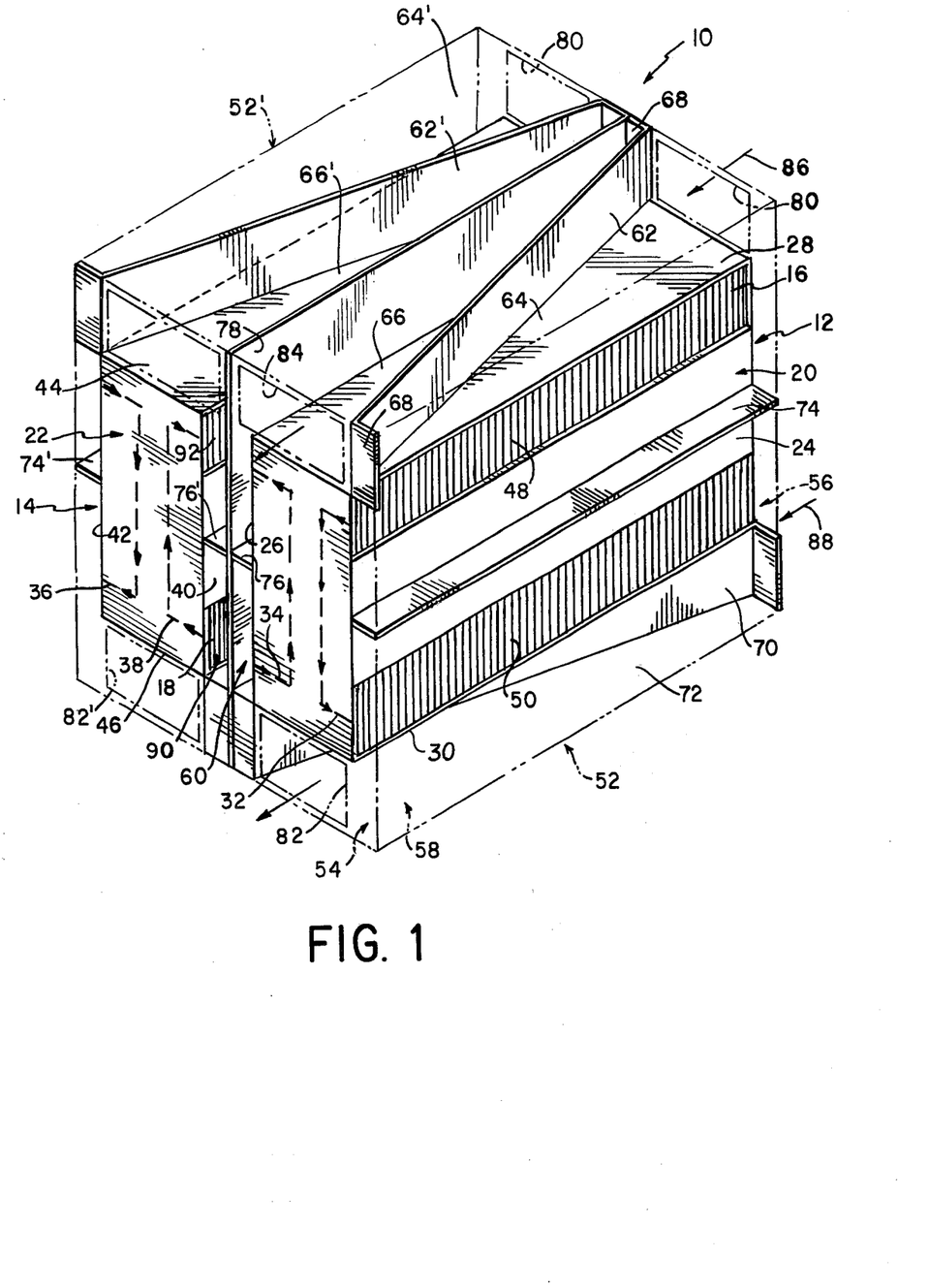
FIG. 1 is an orthogonal view, partially broken away, of one embodiment of the present invention.

Referring now to the drawings wherein like reference characters designate identical or corresponding parts throughout the several views, and more particularly to FIG. 1, a heat exchanger assembly, according to one embodiment of the invention, generally denoted as 10, is shown. The assembly includes two heat exchanger modules 12 and 14, each module being of the type wherein thermal energy is transmitted between two gases flowing is opposite directins. Each module 12, 14 comprises a folded sheet 16, 18 respectively of heat conductive material, the individual folds of the sheet defining adjacent fluid flow passages with alternate ones of the passages defining a first conduit means for conducting a relatively warm gas, the other passages defining a second conduit means for conducting a relatively cool gas. The folded sheets 16, 18 of heat conductive material are contained within respective casings 20, 22 having substantially rectangular cross sections. These heat exchangers are well know and are generally described in U.S. Pat. No. 2,019,351 to H. F. Lathrop, granted Oct. 29, 1935.

Referring to heat exchanger module 12, the casing 20 includes a pair of opposed sides 24, 26 and first and second end walls 28, 30, respectively. The folded thermal transfer sheet 16, of heat exchanger module 12 defines first and second conduit means, generally symbolized by the dotted fluid flow lines 32, 34. Similarly, the folded thermal transfer sheet 18 of the heat exchanger module 14 defines first and second conduit means, symbolized by fluid flow lines 36, 38 and also includes opposed sides 40, 42 and first and second end walls 44, 46.

Referring only to the heat exchanger module 12, entrance and exit openings 48, 50 for first conduit means 32 are formed in opposed side 24 while similar entrance and exit openings (not shown) are provided in opposed side 26 for second conduit means 34. It is noted that as shown in FIG. 1, whereas entrance opening 48 of first conduit means 32 is located on the upper side of module 12, the entrance opening for second conduit means 34 is located on the lower side of the module with similar reverse locations for the respective exit openings of the two conduit means. The heat exchanger module 12 (together with module 14, in the illustrated embodiment) is enclosed within a housing 52 having front and rear walls 54, 56 which extend somewhat above and below module end walls 28, 30 respectively to define upper and lower chambers in conjunction with the first and second end walls 28, 30 of the module 12. Housing 52 is also somewhat wider than the width of module 12 in order to define spaces between the housing side walls 58, 60 and the opposed module sides 24, 26 respectively.

A baffle plate 62 extends perpendicular to and from one corner of first end wall 28 to a diagonally opposed end corner of first end wall 28 partially defining first and second plenum chambers 64, 66 respectively. The upper and lower edges of baffle plate 62 are sealed, as by welding, to the top of housing 52 and to the upper surface of first end wall 28, respectively, so that the first and second plenum chambers are fluidly sealed from each other. The ends 68 of baffle plate 62 may be bent outwardly for connection to the front and rear housing walls 54, 56.

First plenum chamber 64 is further defined by the portion of the top of housing 52 which extends to the right (as shown in FIG. 1) of baffle 62, the portion of first casing end wall 28 which similar extends to the right of baffle 62, a baffle 74 perpendicular to and which extends longitudinally across first opposed casing side 24 and the portions of opposed casing side 24 and housing side wall 58 which extend above (as shown in FIG. 1) baffle 74.

Similarly, second plenum chamber 66 is further defined by the portions of the top of housing 52 and first casing end wall which extend to the left (as shown in FIG. 1) of baffle 62, a baffle 76 perpendicular to and which extends longitudinally across second opposed casing side 26 and the portions of opposed casing side 26 and a vertical wall 78 which extend above baffle 76. The upper and lower edges of vertical wall 78 are sealed to the top and bottom sides of housing 52. It should be noted that in the present embodiment, vertical wall 78 may be omitted entirely so that second plenum chamber 66 is merged into a corresponding plenum chamber, described below, associated with heat exchanger module 14.

In a similar manner a baffle plate 70 is provided between the lower housing wall and the heat exchanger module second end wall 30 extending from one end corner of second end wall 30 to a diagonally opposed one to partially define a third plenum chamber 72 and a fourth plenum chamber (not shown).

Third plenum chamber 72 is further defined by the portions of the bottom of housing 52 and the second casing end wall 30 which extend to the right (as shown in FIG. 1) of baffle 70, baffle 74, and the portion of opposed casing side 24 and housing side wall 58 which extend below (as shown in FIG. 1) baffle 74.

Similarly, the fourth plenum chamber is further defined by the portions of the bottom of housing 52 and the second casing end wall 30 which extend to the left of baffle 70, baffle 76, and the portions of opposed casing side 26 and vertical wall 78 which extend below baffle 76. Again, vertical wall 78 may be omitted so that the fourth plenum chamber will merge into a corresponding plenum chamber associated with heat exchanger module 14.

Depending upon the particular diagonal orientation of baffle plates 62, 70 the first through fouth plenum chambers communicate with selected entrance and exit openings of the first and second conduit means of heat exchanger module 12. In the embodiment shown, the first plenum chamber 64 fluidly communicates with entrance opening 48 of first conduit means 32 while the third plenum chamber 72 communicates with the exit opening 50 of first conduit means 32. Conversely, the fourth plenum chamber (not shown) communicates with the entrance opening of second conduit means 34 while the second plenum chamber 66 communicates with the exit opening of second conduit means 34.

An entrance opening 80 for first plenum chamber 64 is provided in the rear housing wall 56 of housing 52. Similarly, an exit opening 82 for third plenum chamber 72 is provided at the bottom of the front housing wall 54 of housing 52. An entrance opening (not shown) for the fourth plenum chamber (also not shown) is provided in the lower portion of rear housing wall 56 while an exit opening 84 for second plenum chamber 66 is provided in the upper portion of the front housing wall 54. Thus, in operation, relatively cool gases, such as fresh, ambient air, denoted by arrow 86 enters the heat exchanger assembly through entrance opening 80 to first plenum chamber 64 while relatively warm gases, such as stale air contained in the interior of a building, denoted by arrow 88 enter the entrance opening (not shown) to the fourth plenum chamber (not shown). The cool gases are directed by baffle 62 and the cooperating structure into first conduit means 32 through opening 48. Similarly, the warm gases are directed by baffle 70 and the cooperating structure into the second conduit means 34. While in the heat exchanger, thermal energy is transferred through the thermal transfer sheet from the warm gases to the cool gases. The warmed gases (formerly cool gases 86) exit from the heat exchanger through opening 50 into third plenum chamber 72 and are directed by the baffle 70 and cooperating structure out through exit opening 82. Similarly, the cooled gases (formerly warm gases 88) exit from the heat exchanger into second plenum chanber 66 and are directed by baffle 62 and cooperating structure out through exit opening 84.

It should be noted that the present invention is not limited to the particular diagonal orientation of baffles 62, 70, shown in FIG. 1. For example, baffle 62 may, alternatively, extend diagonally between the other corners of first end wall 28. In such a case, entrance and exit openings 80, 84 of the first and second conduit means respectively would be reversed, i.e., the entrance opening would be located on the front housing wall 54, while the exit opening would be located on the rear housing wall 56. The baffles may be designed so as to be pivotable to alternately reverse the entrance and exit openings as described above or may be permanently affixed to the structure.

A feature of the present invention is that a plurality of heat exchanger modules may be positioned relative to each other so that the entrance and exit openings of selected conduit means of one heat exchanger module are in confronting, spaced relationship with respect to the entrance and exit openings respectively of selected conduit means of the other heat exchanger module. As shown in FIG. 1, heat exchanger module 14 is in spaced, confronting relationship to heat exchanger module 12. The second conduit means 38 of module 14 has entrance and exit openings 90, 92 formed in opposed side 40 which are in confronting relationship with the respective entrance and exit openings (not shown) of second conduit means 34.

In brief, the structure associated with module 14 is substantially the same as that described above with respect to module 12. Briefly, a housing 52' is provided with baffles 62', 74', 76' and a baffle corresponding to baffle 70 (not shown). This structure defines first through fouth plenum chambers 64', 66', and the two corresponding to the lower plenum chambers of module 12 which are not shown. Entrance and exit openings to the plenum chambers associated with module 14 are similarly provided as in the case of module 12. As seen in FIG. 1, the respective entrance and exit openings for the corresponding plenum chambers in that two heat exchanger modules are laterally juxtaposed with respect to each other. For example, entrance openings 80, 80' to the first plenum chambers 64, 64' (which communicate with the first conduit means) are laterally adjacent to each other while the exit openings from the third plenum chambers 82, 82' (which also communicate with the first conduit means) are laterally adjacent to each other. This positioning of the entrance and exit openings is determined, as mentioned above, by the configuration of diagonally oriented baffles 62, 62', 70, etc.

When the baffles are in the configuration shown in FIG. 1, the vertical wall 78, as mentioned above, can be omitted entirely from the structure. In such case, the second plenum chambers 66, 66' associated with modules 12, 14 respectively, merge into a single second plenum chamber. Similarly, the fourth plenum chambers (not shown) are merged into a single one.

As can be readily seen, the module and housing structure associated with module 14 is substantially identical to that of module 12 but reversed with respect thereto. By virtue of this unique structural relationship, as many modules may be provided in spaced, confronting relationship as desired depending upon the desired capacity of the assembly. Thus, the capacity of the heat exchanger assembly is optimized while maintaining the depth of the module constant thereby eliminating any deleterious entrance effects which occurred in the past when seeking to increase the capacity of heat exchangers.

Figure 2:
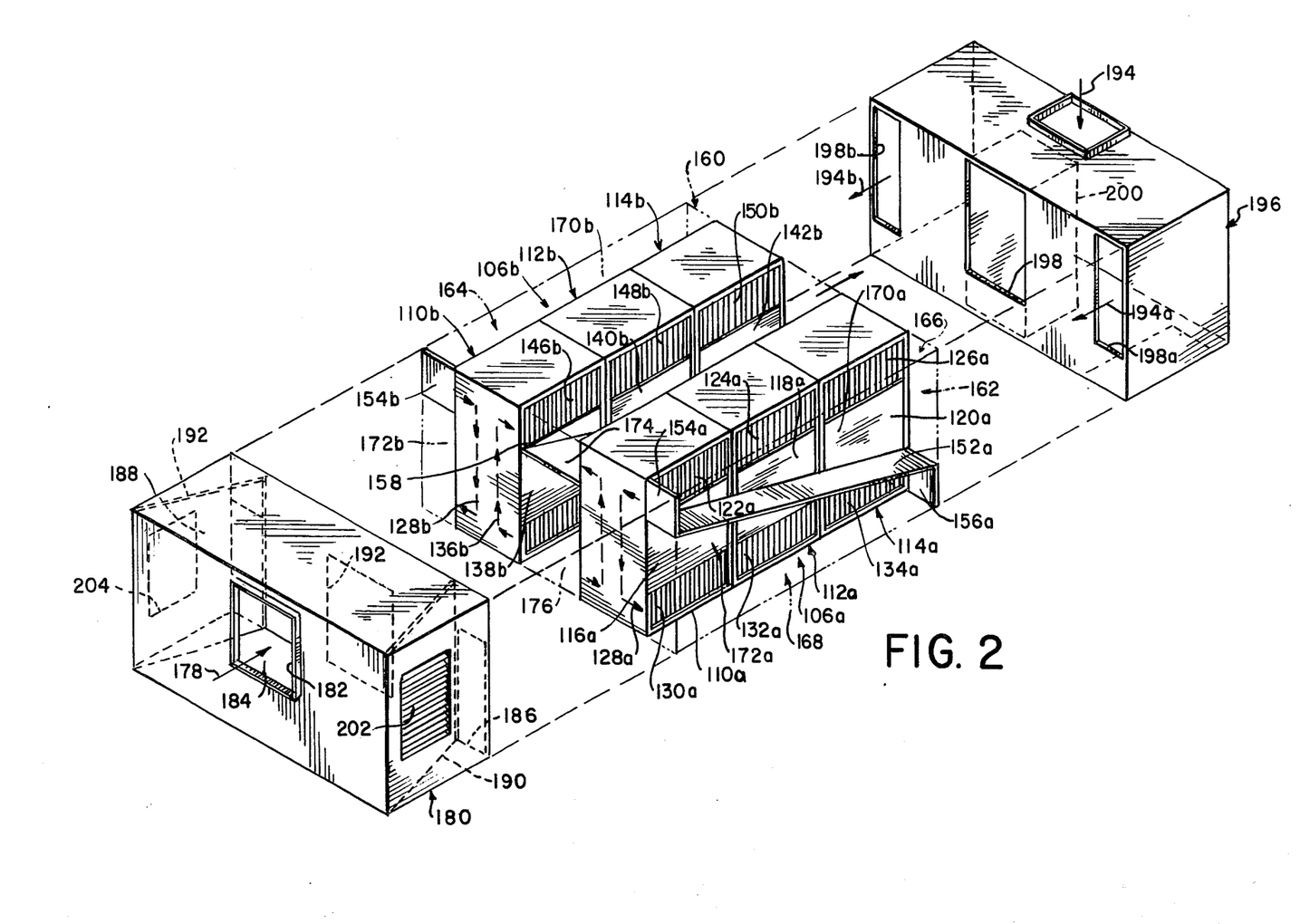
FIG. 2 is an orthogonal view of another embodiment of the present invention together with additional fluid directing apparatus which is illustrated in exploded relationship with respect to the apparatus of the invention.

Turning now to FIG. 2, another embodiment of the present invention is illustrated. In this embodiment, the first and second sets 106a, 106b of heat exchanger modules are shown. The first set 106a includes 3 modules denoted 110a, 112a, and 114a, while the second set 106b includes 3 modules, denoted 110b, 112b, and 114b.

Each heat exchanger module, e.g., module 110a, is of the type generally discussed hereinbefore. Each heat exchanger module includes a folded sheet of heat conductive material, the folds of the sheet defining adjacent fluid flow passages and alternate ones of the passages defining first and second conduit means for conducting relatively warm and cool fluids. The folded sheet is contained within a casing having first and second opposed sides and first and second end walls with entrance and exit openings for the conduit means being formed in the respective opposed sides adjacent to the first and second end walls.

Referring to the first set 106a, modules 110a, 112a, and 114a, are located in side by side relationship so that their first opposed sides, denoted 116a, 118a, and 120a, (the second opposed sides not being shown) are laterally juxtaposed in substantially coplanar relationship so that the entrance openings, denoted 122a, 124a and 126a of first conduit means 128a of each module are laterally juxtaposed while the exit openings 130a, 132a and 134a are similarly laterally juxtaposed. Of course, by this positining, the entrance and exit openings of the second conduit means 136a of each module of the first heat exchanger set 106a are similarly respectively laterally juxtaposed.

Referring to the second set 106b of heat exchanger modules, the modules 110b, 112b and 114b, are similarly located in side by side relationship with the second opposed sides 138b, 140b and 142b (the first opposed sides not being shown) being laternally juxtaposed in substantially coplanar relationship so that the entrance openings 144b (the other two not being shown) of second conduit means 136b of each module are laterally juxtaposed in substantially coplanar relationship while the exit openings 146b, 148b and 150b of second conduit means 136b are laterally juxtaposed in substantiallycoplanar relationship. Of course, the entrance and exit openings for the first conduit means 128b of second heat exchanger set 106b are similarly laterally juxtaposed.

As shown in FIG. 2, the first and second heat exchanger sets 106a and 106b are located in spaced, confronting relationship with the entrance and exit openings of the second conduit means 136a of the first set 106a being in spaced confronting relationship to the entrance and exit openings respectively of second conduit means 136b of the second set 106b.

A baffle plate 152a is provided which extends diagonally across the laterally juxtaposed first opposed sides 116a, 118a, and 120a of the first heat exchanger set 106a from a point just below the lower left (as shown in FIG.

2) corner of entrance opening 122a to a point just above the upper right (as shown in FIG. 2) corner of exit opening 134a. Baffle end portions 154a, 156a, which may be integrally formed with baffle 152a cover the left and right vertical edges (as seen in FIG. 2) of entrance and exit openings 122a and 134a respectively. A similar baffle (only baffle end portion 154b being shown) is similarly provided over the first opposed sides (not shown) of second heat exchanger set 106b. A third baffle 158 extends diagonally between the first and second heat exchanger sets from a point just below the lower left corners of exit openings 146a and b (146a not being shown) of the opposed modules 110a and 110b to a point just above the upper right corners of entrance openings of opposed modules 114a and b of second conduit means 136a and b. The longitudinal edges of third baffle plate 158 are connected, as by welding, to the second opposed sides 138a and b, 140a and b, and 142a and b interconnecting the first and second heat exchanger sets while the inner longitudinal edges of baffle plates 152a and 152b are connected, as by welding, to the first opposed sides 116a and b, 118a and b and 120a and b (the b sides not being shown).

A housing 160 (shown in phantom) containing heat exchanger sets 106a and b is provided having front and rear walls 162, 164 respectively and top and bottom walls 166, 168 respectively. The outer longitudinal edges of baffles 152a and 152b (152b not being shown) are connected, as by welding, to the inner surfaces of front and rear walls 162 and 164 of housing 160 while the upper and lower sides of the modules are flush with the inner surfaces of top and bottom housing walls 166, 168.

First plenum chambers 170a and b are defined by the upper surface of baffle plates 152a and b, and the portions of the first opposed module sides 116a and b, 188a and b, and 120a and b and the front and rear housing walls 164, 166 which extend above (as shown in FIG. 2) baffles 152a and b. Second plenum chambers 172a and b are defined by the lower surfaces of baffle plates 152a and b, and the portions of first opposed module sides 116a and b, 118a and b, and 120a and b and front and rear housing walls 162, 164 which extend below baffle plates 152a and b. The first plenum chambers 170a and b fluidly communicate with the entrance openings of the first conduit means 128a and b respectively while the second plenum chambers 172a and b fluidly communicate with the exit openings of first conduit means 128a and b respectively.

A third plenum chamber 174 is defined by the upper surface of third baffle 158, the portions of second opposed sides 138a and b, 140a and b, and 142a and b (the a sides not being shown) which extend above baffle 158 and the top housing wall 166. A fourth plenum chamber 176 is defined by the lower surface of baffle 158, the portions of second opposed sides 138a and 138b, etc., which extend below baffle 158 and the bottom housing wall 168. The third plenum chamber 174 fluidly communicates with the exit openings of fluid conduit means 136a and b of both first and second heat exchanger sets 106a and b, while the fourth plenum chamber fluidly communicates with the entrance openings of second conduit means 136a and b of both heat exchanger sets 106a and b.

In operation, for example where stale air is evacuated from the interior of a building with fresh air from outside the building replacing the same, the stale, warm air, denoted by arrow 178 is directed from duct work within the building (not shown) into a box 180 through an opening 182. Box 180 is divided into three chambers, namely, central chamber 184, the end chambers 186, 188, by a pair of plates 190, 192. The stale air 178 fills central chamber 184 and exits therefrom through an opening 192 and fills fourth plenum chamber 176. It is noted that opening 192 is displaced downwardly so that its upper edge is either coincident with or below the adjacent edge of baffle 158. This is necessary so that the stale air does not enter into third plenum 174. Alternatively, a baffle end portion may be provided on the end of baffle 158 similar to baffle end portions 154. Stale air 178 enters into the second conduit means 136a and b of first and second heat exchanger sets 106a and 106b. Meanwhile, fresh air, denoted by arrow 194 enters into a box 196 through duct work (not shown) and exits from a pair of openings 198a and 198b which corresponds to the openings of first plenum chambers 170a and b (arrows 194a and 194b). Box 196 has a central opening 198 which communicates with a duct 200, the interior volume of which is isolated from the rest of the interior of box 196. The fresh, cool air enters into first plenum chambers 170a and b and enters first conduit means 128a and b of first and second heat exchanger sets 106a and b.

The warmed air (formerly cool air 194a and b) exits from first conduit means 128a and b into second plenum chambers 172a and b whereupon it is directed into chambers 186, 188 of box 180 where it exits through vent openings 202, 204. The stale air, now cooled, exits from second conduit means 136a and b into third plenum chamber 174 and enters duct 200 through opening 198 in box 196. The stale, warm air has been cooled by the fresh, cool air while, conversely, the cooler air has been warmed by the warmer air.

Whereas FIG. 2 illustrates an assembly having two sets of heat exchanger modules, it is within the scope of the present invention to provide only one set of such modules or more than two sets. For example, additional sets of each exchanger modules may be spaced from each other in confronting relationships similar to the manner in which heat exchanger sets 106a and b are located.

As in the case of the first embodiment, the capacity of the heat exchanger assemblies have been greatly maximized while maintaining the length of the flow path in each conduit means significantly larger than at least one of the width dimensions of the flow path thereby minimizing deleterious entrance effects. Further, the depth of the individual modules have been maintained sufficiently small.

Figure 3:
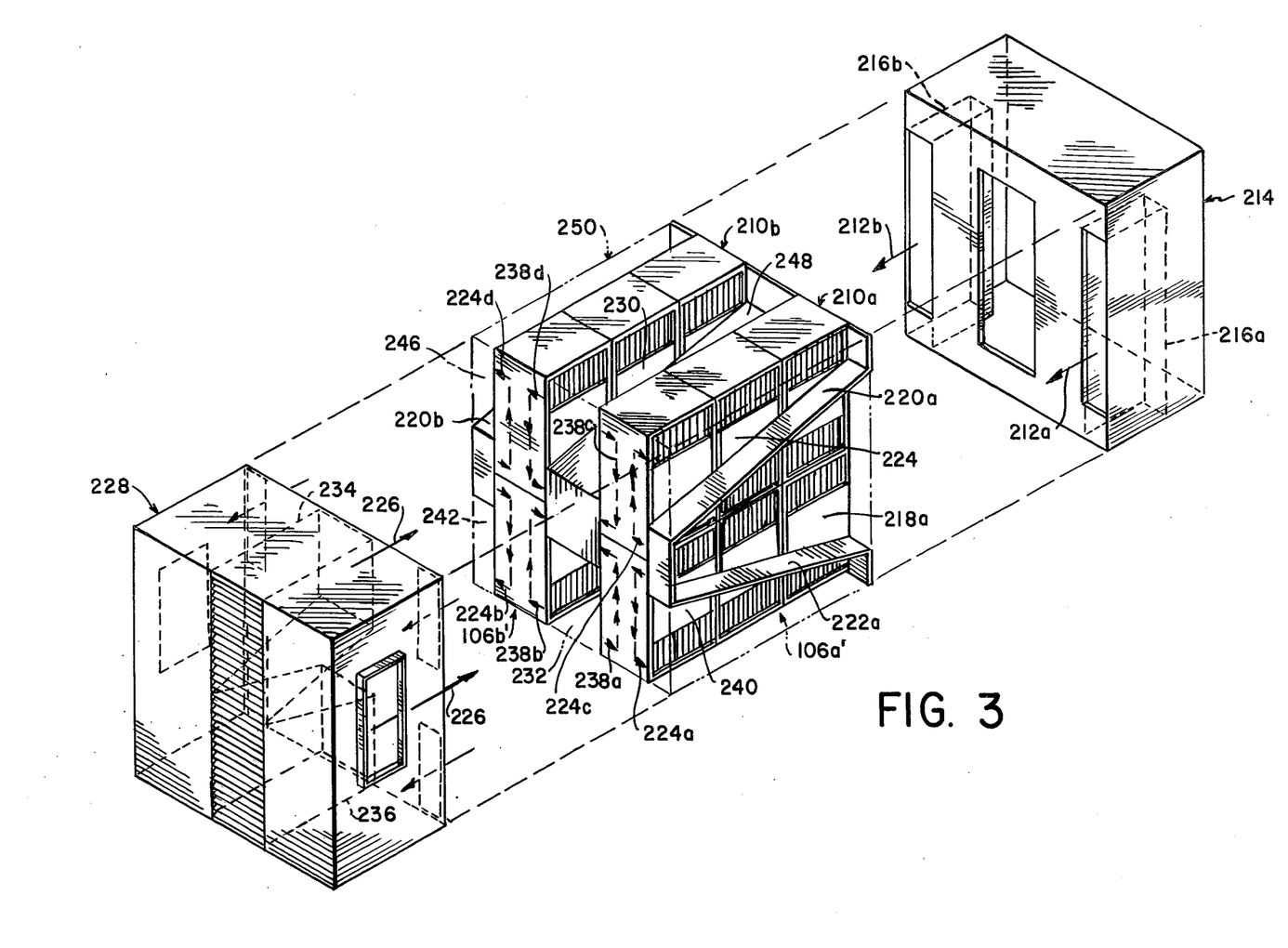
FIG. 3 is an orthogonal view of a modification of the invention shown in FIG. 2.

Turning now to FIG. 3, a modification of the embodiment of the invention shown in FIG. 2 is illustrated. Briefly, in this modification, vertically juxtaposed over two heat exchanger sets similar to those described with respect to FIG. 2 hereinabove, denoted 106a' and 106b' are third and fourth heat exchanger sets 210a and b, third heat exchanger set 210a being vertically juxtaposed over heat exchanger set 106a' while fourth heat exchanger set 210b is vertically juxtaposed over second heat exchanger set 106b'.

The structure of the modification shown in FIG. 3 is best and most easily understood through a description of its operation. Warm, stale air, denoted by arrows 212a and b are directed through a box 214 via ducts 216a and b and into a plenum chambers 218a and b (only plenum chamber 218a being shown), plenum chamber 218a being defined by baffles 220a and 222a and plenum chamber 218b (not shown) being defined by baffles 220b and 222b (not shown) and, in addition, the opposed sides of the heat exchanger modules enclosed between these baffles. The stale air 212 enters first conduit means 224a, b, c, and d. Meanwhile, cool, fresh air, denoted by arrows 226 which have been directed into a box 228 is directed into the plenum chambers 230, 232 via ducts 234, 236 within box 228. Plenum chamber 230 is defined by the upper surface of a diagonally extending baffle plate 248, the portions of opposed sides of heat exchanger sets 210a and 210b which face each other and which extend above baffle plate 248 and the top wall of a housing 250 (shown in phantom). Plenum chamber 232 is defined by the lower surface of a diagonally extending baffle plate (not shown) which corresponds to baffle 158 in FIG. 2, the portions of opposed sides of heat exchanger sets 210a and 210b which face each other and which extend below this baffle plate and the bottom wall of housing 250. This cool air enters second conduit means 238a, b, c, and d. While in the heat exchanger sets the warm air inparts thermal energy to the cool air.

The air in the first conduit means 224a, b, c and d exit into plenum chambers 240, 242, 244 and 246 respectively. The air in second conduit means 238a, b, c and d all exit into a single plenum chamber defined between baffle plate 248 and the one which corresponds to baffle 158 in FIG. 2 and the portions of the opposed facing module sides contained between these baffles.

The warm air 212 which has been cooled in the heat exchanger exits from plenum chambers 240, 242, 244 and 246 into box 228, while the cool air which has been warmed in the heat exchanger exits into box 214. Appropriate duct work (not shown) directs these air streams to desired locations.

It is seen that according to this modification of the invention, as many heat exchanger sets as is practical within a given spacial location may be utilized either in horizontal (FIG. 2) or vertical (FIG. 3) relationship while retaining the benefits of the invention.

What is claimed is:

1. A heat exchanger assembly for transmitting thermal energy from one moving body of fluid to another comprising
   a folded sheet of heat conductive material, the individual folds of said sheet defining adjacent fluid flow passages, alternate ones of said passages defining a first conduit means for conducting relatively warm fluids, the other passages defining a second conduit means for conducting relatively cool fluids;
   a casing containing said folded sheet having a substantially rectangular cross section having a pair of opposed side walls and first and second end walls, entrance and exit openings for said first conduit means being formed in one of said opposed sides adjacent the first and second end walls respectively and entrance and exit openings for said second conduit means being formed in the other of said opposed sides adjacent the second and first end walls respectively;
   a housing enclosing said casing, said housing having top and bottom walls substantially parallel to and spaced from said first and second end walls respectively, front and rear walls, and a pair of side walls, each being substantially parallel to and spaced from a respective one of said pair of opposed casing side walls;
   a first baffle plate extending across and substantially perpendicularly to said first casing end wall having one elongate edge sealingly affixed thereto and the other elongate edge sealingly affixed to the top housing wall;
   a second baffle plate extending across and substantially perpendicularly to said second casing end wall having one elongate edge sealingly affixed thereto and the other elongate edge sealingly affixed to the bottom housing wall;
   a third baffle plate extending across one of said pair of opposed casing side walls having one elongate edge sealingly affixed thereto and the other elongate edge sealingly affixed to the corresponding housing side wall;
   a fourth baffle plate extending across the other of said pair of opposed casing side walls having one elongate edge sealingly affixed thereto and the other elongate edge sealingly affixed to the corresponding housing side wall;
   said first and third baffle plates defining a first plenum chamber fluidly communicating with the first conduit means entrance opening, said first and fourth baffle plates defining a second plenum chamber fluidly communicating with the second conduit means exit opening, said second and third baffle plates defining a third plenum chamber fluidly communicating with said first conduit means exit opening and said second and fourth baffle plates defining a fourth plenum chamber fluidly communicating with said second conduit means entrance opening;
   whereby fluid at a first temperature is directed into one of said first or third plenum chambers, into said first conduit means and then into the other of said first or third plenum chambers while fluid at a second temperature is directed into one of said second or fourth plenum chambers, into said second conduit means wherein thermal exchange occurs between said fluids, and then into the other of said second or fourth plenum chambers.

2. A heat exchanger assembly as recited in claim 1 wherein said first and second plenum chambers have entrance and exit openings respectively in planes substantially perpendicular to the planes of said opposed casing sides.

3. A heat exchanger assembly as recited in claim 1 wherein said third and fourth plenum chambers have exit and entrance openings respectively in planes substantially perpendicular to the planes of said opposed casing sides.

4. A heat exchanger assembly as recited in claim 1 wherein said first and second baffle plates extend substantially diagonally across said first and second casing end walls.

5. A heat exchanger assembly comprising:
   at least two heat exchangers for transmitting thermal energy from one moving body of fluid to another, each heat exchanger comprising,
   a folded sheet of heat conductive material, the individual folds of said sheet defining adjacent fluid flow passages, alternate ones of said passages defining a first conduit means for conducting relatively warm fluids, the other passages defining a second conduit means for conducting relatively cool fluids and;
   a casing containing said folded sheet having a pair of opposed side walls and first and second end walls, entrance and exit openings for said first conduit means being formed in one of said opposed sides adjacent to the first and second end walls respectively and entrance and exit openings for said second conduit means being formed in the other of said opposed sides adjacent to the second and first end walls respectively;

said at least two heat exchangers being fixed in position relative to each other with one of the side walls of one heat exchanger being in spaced opposed relationship to one of the side walls of the other heat exchanger thereby defining a pair of inwardly and a pair of outwardly facing side walls;

a housing enclosing said at least two heat exchangers, said housing having top and bottom walls spaced from said first and second end walls of said exchanger casings respectively, front and rear walls, and a pair of side walls, each being spaced from a respective one of said outwardly facing casing side walls;

at least two first baffle plates, each extending across and substantially perpendicularly to said first casing end wall of one of said heat exchangers and having one elongate edge sealingly affixed thereto and the other elongate edge sealingly affixed to the top housing wall;

at least two second baffle plates, each extending across and substantially perpendicularly to said second casing end wall of one of said heat exchangers and having one elongate edge sealingly affixed thereto and the other elongate edge sealingly affixed to the bottom housing wall;

a pair of third baffle plates, each extending across one of said outwardly facing casing side walls and having one elongate edge sealingly affixed thereto and the other elongate edge sealingly affixed to the respective opposed housing side wall; and at least one fourth baffle plate extending between said heat exchangers having one elongate edge sealingly affixed to one of said inwardly facing casing side walls and the other elongate sealingly affixed to the other inwardly facing casing side wall.

6. A heat exchanger assembly as recited in claim 5 wherein said at least two first baffle plates each extend substantially diagonally across the respective first casing end walls and said at least two second baffle plates each extend substantially diagonally across the respective second casing end walls.

* * * * *

UNITED STATES PATENT OFFICE
CERTIFICATE OF CORRECTION

Patent No. 4,042,018                Dated August 16, 1977.

Inventor(s) William Henry Zebuhr

It is certified that error appears in the above-identified patent and that said Letters Patent are hereby corrected as shown below:

Col. 1, line 9, change "defined" to -- define --

Col. 2, line 33, before "exchanger" insert -- juxtaposed --

Col. 3, line 7, change "directins" to -- directions --

Col. 3, line 65, change "similar" to -- similarly --

Col. 3, line 68, after "side" insert -- wall --

Col. 4, line 39, change "fouth" to -- fourth --

Col. 4, line 68, change "similary" to -- similarly --

Col. 5, line 45, change "fouth" to -- fourth --

Col. 5, line 51, change "that" to -- the --

Col. 6, line 40, change "positining" to -- positioning --

Signed and Sealed this

Twenty-fourth Day of January 1978

[SEAL]

Attest:

RUTH C. MASON        LUTRELLE F. PARKER
*Attesting Officer*     *Acting Commissioner of Patents and Trademarks*